(12) United States Patent
Bartek et al.

(10) Patent No.: US 9,120,980 B2
(45) Date of Patent: Sep. 1, 2015

(54) CATALYST/BIOMASS MIXING IN TRANSPORT REACTOR

(75) Inventors: Robert Bartek, Studio City, CA (US); Ronald Cordle, League City, TX (US); Steve Yanik, Colorado Springs, CO (US); Paul O'Connor, Hoevelaken (NL)

(73) Assignee: KiOR, Inc., Pasadena, TX (US)

( * ) Notice: Subject to any disclaimer, the term of this patent is extended or adjusted under 35 U.S.C. 154(b) by 821 days.

(21) Appl. No.: 13/264,925

(22) PCT Filed: May 5, 2010

(86) PCT No.: PCT/US2010/033697
§ 371 (c)(1),
(2), (4) Date: Dec. 6, 2011

(87) PCT Pub. No.: WO2010/129654
PCT Pub. Date: Nov. 11, 2010

(65) Prior Publication Data
US 2012/0090977 A1    Apr. 19, 2012

Related U.S. Application Data

(60) Provisional application No. 61/175,499, filed on May 5, 2009.

(51) Int. Cl.
*C10B 49/22* (2006.01)
*C10G 1/08* (2006.01)
(Continued)

(52) U.S. Cl.
CPC .................. *C10G 1/08* (2013.01); *B01J 8/0025* (2013.01); *B01J 8/1845* (2013.01); *C10B 49/22* (2013.01); *C10B 53/02* (2013.01); *C10B 57/06* (2013.01); *C10G 1/02* (2013.01); *C10G 11/18* (2013.01);
(Continued)

(58) Field of Classification Search
CPC ........ C10B 49/22; C10B 53/02; C10B 57/06; C10G 1/02; C10G 1/08; C10G 11/18; B01J 8/0025; B01J 8/1845
USPC ............ 201/2.5, 12, 31, 32; 202/99; 422/139, 422/142, 145, 214
See application file for complete search history.

(56) References Cited

U.S. PATENT DOCUMENTS 3,639,228 A     2/1972   Carr et al.
4,039,390 A  *  8/1977   Logan ............................. 201/12
(Continued)

FOREIGN PATENT DOCUMENTS

CN        1730177 A      2/2006
CN      101016467 A      8/2007
WO     2008/020047 A2    2/2008

OTHER PUBLICATIONS

International Search Report and Written Opinion for co-pending PCT Application No. PCT/US2010/033697, filed May 5, 2010; Dated Jul. 9, 2010; 8 pages.
(Continued)

*Primary Examiner* — Jill Warden
*Assistant Examiner* — Joye L Woodard
(74) *Attorney, Agent, or Firm* — Hovey Williams LLP

(57) ABSTRACT

A reactor and/or process is disclosed for fluidized cracking of solid particulate biomass material, including a first mixing zone where a particulate stream comprising solid particulate biomass is mixed with a lift gas and becomes fluidized, and including a second mixing zone where a heat carrier material is mixed with the fluidized solid particulate biomass material.

17 Claims, 1 Drawing Sheet

(51) Int. Cl.
| | |
|---|---|
| *C10G 1/02* | (2006.01) |
| *C10B 53/02* | (2006.01) |
| *C10B 57/06* | (2006.01) |
| *C10G 11/18* | (2006.01) |
| *B01J 8/18* | (2006.01) |
| *B01J 8/00* | (2006.01) |

(52) U.S. Cl.
CPC . *B01J 2208/0038* (2013.01); *B01J 2208/00752* (2013.01); *C10G 2300/1014* (2013.01); *Y02E 50/14* (2013.01)

(56) References Cited

U.S. PATENT DOCUMENTS

| | | | | |
|---|---|---|---|---|
| 4,083,751 | A | * | 4/1978 | Choi et al. ............ 201/12 |
| 4,430,195 | A | | 2/1984 | Oltrogge |
| 4,490,241 | A | | 12/1984 | Chou |
| 4,693,189 | A | * | 9/1987 | Powers ............ 110/108 |
| 5,154,818 | A | * | 10/1992 | Harandi et al. .......... 208/74 |
| 5,770,045 | A | | 6/1998 | Gosling et al. |
| 5,961,786 | A | * | 10/1999 | Freel et al. ............ 201/12 |
| 8,007,728 | B2 | * | 8/2011 | Palmas et al. ........... 422/145 |
| 2007/0213573 | A1 | | 9/2007 | Ross et al. |
| 2009/0007484 | A1 | | 1/2009 | Smith |
| 2009/0090046 | A1 | | 4/2009 | O'Connor et al. |
| 2010/0083576 | A1 | * | 4/2010 | Bunk et al. ............ 48/210 |
| 2010/0162625 | A1 | * | 7/2010 | Mills ............ 422/187 |

OTHER PUBLICATIONS

Chinese Office Action for related Chinese Patent Application No. 201080020325.6, Applicant: KiOR, Inc.; Dated Aug. 12, 2013; 8 pages.

European Search Report for related European Patent Application No. 10772755.4; Applicant: KiOR, Inc.; Dated Jan. 7, 2014; 10 pages.

A.A. Lappas et al., Production of biofuels via co-processing in conventional refining processes, Catalysis Today, Sep. 2, 2008, pp. 55-62, www.elsevier.com/locate/cattod, Science Direct, Thermi-Thessaloniki, Greece.

Craig Hulet et al., A Review of Short Residence Time Cracking Processes, International Journal of Chemical Reactor Engineering, vol. 3, Review R1, 2005, XP008080585, 76 pages, University of Western Ontario, Canada.

A.A. Lappas et al., Biomass pyrolysis in a circulating fluid bed reactor for the production of fuels and chemicals, Fuel 81, www.fuelfirst.com, Elsevier, pp. 2087-2095, 2002.

* cited by examiner

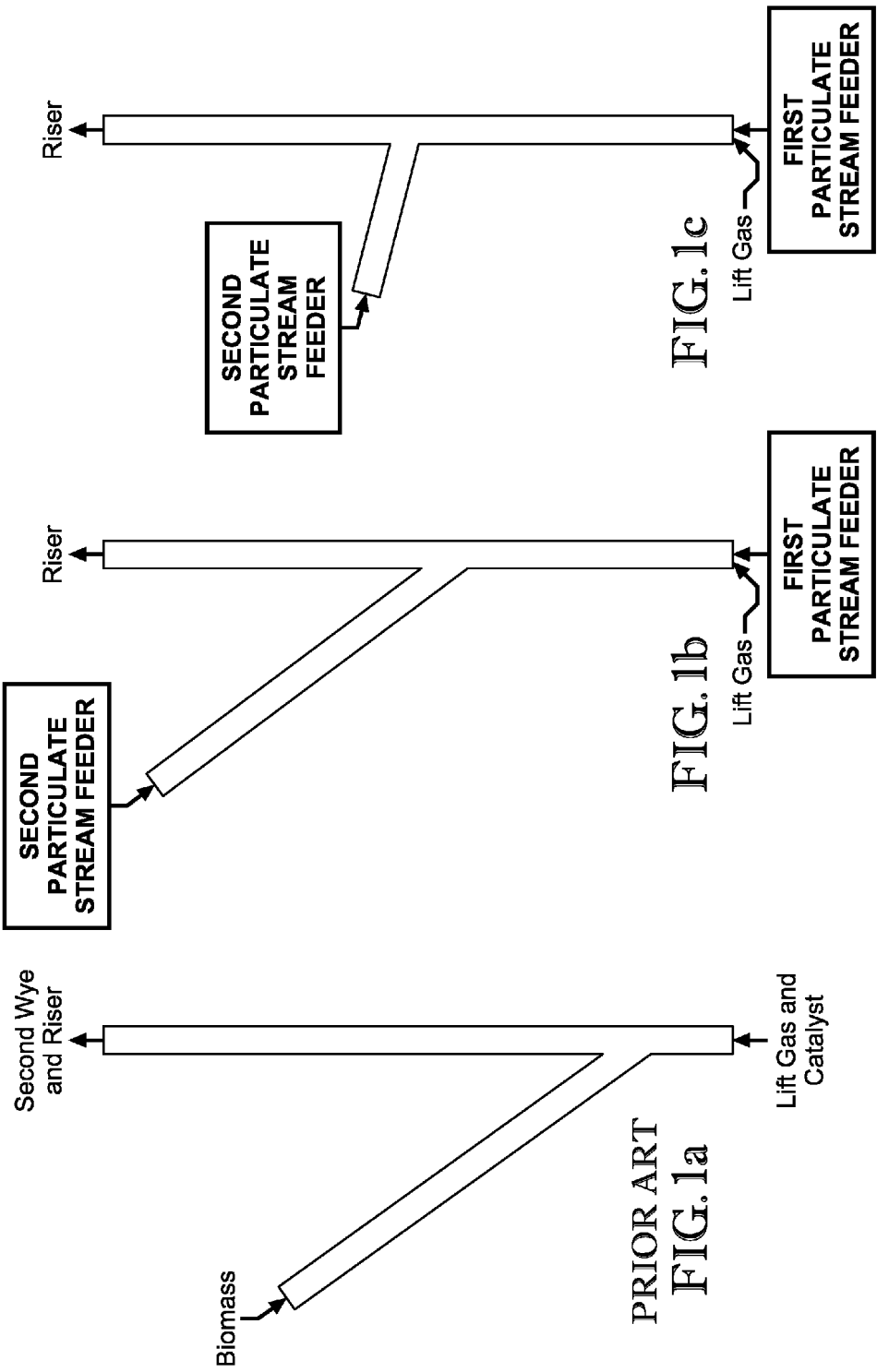

CATALYST/BIOMASS MIXING IN TRANSPORT REACTOR

BACKGROUND OF THE INVENTION

1. Field of the Invention

The invention relates generally to an improved reactor for pyrolysis of solid particulate biomass material, and more particularly to the mixing zones for mixing the solid biomass materials with a lifting medium and with a heat transfer medium.

2. Description of the Related Art

Entrained bed reactors, also referred to as transport reactors, are well known in the field of fluid catalytic cracking (FCC). This process is employed in crude oil refineries for cracking relatively heavy feedstocks, such as vacuum gas oil (VGO) to hydrocarbon compounds having boiling points in, for example, the gasoline and diesel ranges.

In a typical FCC reactor, hot particulate catalyst is mixed in a mixing section with a non-oxidizing lift gas. The hot catalyst particles become entrained by the flow of lift gas. The liquid feedstock is sprayed into this flow of entrained catalyst particles. Upon contact with the heat of the catalyst particles, the feedstock droplets rapidly vaporize. The formation of feedstock vapors causes a further acceleration of the catalyst particles. The hydrocarbons present in the vapors are catalytically cracked to the desired molecular weight range.

U.S. Pat. No. 5,961,786 to Freel et al. discloses an FCC-type reactor for carrying out a thermal or catalytic pyrolysis of a variety of feedstocks, including liquid and solid biomass materials. The reactor is an upflow, entrained bed reactor, and comprises a mixing section with a first inlet means and a secondary inlet means. Hot transfer medium particles are introduced into the mixing zone via the first inlet means. The lifting gas takes up the heat transfer particles and carries them upward. Feedstock is injected into the flow of hot heat transfer particles via the secondary inlet means.

The '786 patent contains examples on use of the reactor in the pyrolysis of wood particles, using sand as the heat transfer medium. The stated aim is to produce wood distillation products that can be used as "liquid smoke" products for flavoring food products, such as meats. The wood distillation products are characterized by a low pH (around 3.0) and a high oxygen content, making them unsuitable for use as liquid fuels or as a blending stock for liquid fuels.

There is a need for an entrained bed reactor for the pyrolysis of solid biomass materials to a liquid product having a low oxygen content.

Thus, there is a particular need for an entrained bed reactor for use in a catalytic pyrolysis process for solid biomass materials.

BRIEF SUMMARY OF THE INVENTION

The present invention addresses these problems by providing a reactor for fluidized cracking of solid particulate biomass material, said reactor comprising:
(i) a first mixing zone for mixing a first particulate stream comprising a particulate solid biomass material with a lifting medium and for fluidizing and transporting the first particulate stream in the lifting medium forming a fluidized first particulate stream;
(ii) a second mixing zone for injecting a second particulate stream comprising a heat carrier material, and for mixing said second particulate stream with the fluidized first particulate stream, said second mixing zone being downstream from the first mixing zone.

In a preferred embodiment the solid biomass material comprises cellulose, in particular lignocellulose.

The preferred heat carrier material is a material having catalytic activity for the cracking of the solid biomass material.

BRIEF DESCRIPTION OF THE DRAWINGS

The features and advantages of the invention will be appreciated upon reference to the following drawing, in which:

FIG. 1a is a schematic view of the mixing zones of a prior art reactor;

FIG. 1b is a schematic view of the mixing zones of the reactor according to one embodiment of the present invention; and FIG. 1c is a schematic view of the mixing zones of the reactor according to one embodiment of the present invention.

DETAILED DESCRIPTION OF THE INVENTION

In conventional FCC units, the mixing zone is generally referred to as the "wye", as in many cases it comprises a tubing assembly having a Y-shape. See, for example, U.S. Pat. No. 6,616,899 to Upson, in particular FIG. 1 thereof hot catalyst particles from the regenerator are metered into one branch of the wye. At the intersection the hot particles meet an upward flow of lift gas, and are entrained by it. Feedstock is injected into the flow of hot particles at a point above the intersection of the wye. In general, the injection point for the feedstock is positioned high enough above the intersection of the wye to permit thorough mixing of the catalyst particles and the lift gas before the catalyst particles are contacted with the feedstock.

U.S. Pat. No. 5,961,786 to Freel et al. discloses an entrained bed reactor for the thermal or catalytic pyrolysis of a variety of materials, including solid or liquid biomass materials. The reactor comprises a mixing zone having a first inlet and a secondary inlet. The mixing zone is designed as a conventional FCC wye. Specifically, the lift gas is first mixed with a hot heat carrier material. The feedstock is subsequently added to this lift gas/heat carrier flow.

The pyrolysis products reported in the '786 patent are intended to be used as "liquid smoke", a product for flavoring food products, in particular meats. These liquid smoke products are characterized by a low pH (around 3), a high oxygen content (around 26 wt %), and a propensity for developing a brown color. Although these properties may be desirable for liquid smoke products, they are highly undesirable for liquid fuels and blending stocks for liquid fuels.

In particular the propensity for developing a brown color indicates that the liquid smoke products comprise components that result from over-cracking of the biomass material. We have found that one factor causing over-cracking in the reactor of the '786 patent is the reported design of the mixing zone.

Unlike a liquid FCC feed, solid particulate biomass material cannot be sprayed into the mixing zone. As a result, as compared to a liquid FCC feed, it takes longer for a solid particulate biomass material to become fully mixed with the lift gas. In an FCC unit, the mixing action is accelerated by the rapid evaporation of the liquid feedstock. Such an effect is not present when mixing solid particulate biomass with a lift gas. The biomass particles need to be partially pyrolyzed before any vapors are created. Thus, to the extent that evaporation aids in the mixing of the biomass particles and the lift gas, the effect is slower in onset and less pronounced than in the conventional FCC process. As a result, more time is needed to obtain good mixing of the solid particulate feedstock than if the feedstock is a liquid.

We have found it important to reverse the order of mixing, so that the solid particulate biomass material becomes mixed with the lift gas before it is contacted with a hot heat carrier material. Accordingly, the present invention relates to a reactor for fluidized cracking of solid particulate biomass material, said reactor comprising:

(i) a first mixing zone for mixing a first particulate stream comprising a particulate solid biomass material with a lifting medium and for fluidizing and transporting the first particulate stream in the lifting medium;

(ii) a second mixing zone for injecting a second particulate stream comprising a heat carrier material, and for mixing said second particulate stream with the fluidized first particulate stream, said second mixing zone being downstream from the first mixing zone.

We have also found that wall effects contribute to undesired over-cracking when solid biomass material is mixed with a lift gas flow already containing hot heat carrier material. For this reason, the advantages of the inventive mixing zones are even greater for small scale reactors, such as pilot plant scale and laboratory scale reactors.

In earlier patent applications we have reported on work done by the assignee of this patent application on developing a biomass pyrolysis process that produces a liquid pyrolysis process characterized by a pH significantly higher than 3, and an oxygen content well below 20 wt %. Both characteristics are important for materials intended to be used as liquid fuels or as blending stocks for liquid fuels, optionally after an upgrading treatment. It has been found that liquid pyrolysis products of desirable quality can be obtained by (i) using a heat carrier comprising a catalytic material; and/or (ii) giving the solid biomass material a pretreatment in order to make it more reactive.

It will be understood that both types of measures aggravate the problems encountered when the biomass material is contacted with the hot heat carrier material before it is properly mixed with the lift gas. If the heat carrier material is a catalytic material, the cracking reaction is accelerated by it, which increases the risk of over-cracking. Likewise, the risk of over-cracking is increased if the solid biomass material has received a pretreatment making it more reactive. It will be appreciated that the design of the mixing zones of the reactor of the present invention is particularly advantageous for catalytic pyrolysis processes, and for pyrolysis processes employing activated biomass materials.

If a catalytic material is used, the material may be a solid acid, a solid base, or a solid amphoteric material.

Examples of suitable solid acid materials include zeolites, in particular zeolite Y and ZSM-5, and materials obtained by high temperature calcination of zeolites.

Examples of suitable solid bases include metal oxides, in particular MgO and CaO; mixed metal oxides; clays; hydrotalcite and hydrotalcite-like materials; layered hydroxy salts; and materials obtained by high temperature calcination of such solid base materials.

Examples of suitable amphoteric materials include aluminas, in particular a-alumina and y-alumina.

Particularly preferred are materials having a low catalytic activity, in particular materials having a specific surface area (as determined by the adsorption of liquid nitrogen, using the Brunauer-Emmett-Teller (BET) method) in the range of from 1 to 50 m$^2$/g, preferably from 5 to 20 m$^2$/g. Such materials may be obtained by high temperature calcination of materials having a significantly greater specific surface area. For example, a suitable catalyst may be obtained by calcining kaolin clay or a similar clay through its isotherm, i.e., to a temperature in the range of 1000 to 1100° C.

Preferably the catalyst particles are in the form of micro spheres, to facilitate their fluidization. The particle size of the catalyst particles is preferably in the range of from 20 μm to 100 μm, in order for the particles to be readily fluidizable.

It will be understood that the catalyst particles may contain catalytically inert materials, such as refractory oxides or sand. Likewise, catalyst particles may be mixed with inert particles, such as sand. In an alternate embodiment, inert materials may be used as the sole heat carrier material.

Pretreatment of the biomass material can comprise one or more of the following: impregnation of a solution of a soluble catalyst, such as KOH, NaOH, $K_2CO_3$, $Na_2CO_3$; mechanical treatment (milling, grinding, kneading, and the like), optionally in the presence of a particulate inorganic material, preferably a catalytic material; demineralization; solvent explosion; heat treatment at a temperature in the range of from 80 to 300° C.; and the like.

The solid biomass material preferably comprises cellulose. Particularly preferred are materials comprising lignocellulose, because of the low cost and abundant availability of such materials.

The first mixing zone preferably has a temperature in the range of from about 0° C. to about 300° C., preferably in the range of from about 125° C. to about 200° C.

In one embodiment the first particulate stream further comprises a particulate inorganic material. This can be the case, for example, if the pretreatment of the solid biomass material comprises a mechanical treatment in the presence of a particulate inorganic material. In this case, the particulate inorganic material present in the first stream may be the same material as is present in the second stream, or it may be a different material. If the two materials are different it is desirable to separate the two materials after leaving the reactor, so that each can be recycled to its appropriate point in the process.

The second particulate stream comprises the hot heat carrier material. Specifically, the second particulate stream, immediately prior to entering the second mixing zone, has a temperature in the range of from about 450° C. to about 1000° C. Preferably the second particulate stream, immediately prior to entering the second mixing zone, has a temperature in the range of from about 500° C. to about 800° C.

The first particulate stream is fed into the first mixing zone by a positive displacement means, preferably selected from the group consisting of a screw feeder, a posimetric feeder, a screw feeder in combination with a vibratory feeder, and a combination of block valves and a vibratory feeder. Preferably, the first particulate stream is fed into the first mixing zone by gravity means preferably though a fluidized bed feeder and control valve.

The second particulate stream can be fed into the second mixing zone by any means known to the person skilled in the FCC art. Preferably the second particulate stream is fed into the second mixing zone by gravity means preferably though a fluidized bed feeder and control valve.

The lifting medium ("lift gas") has a velocity in the first mixing zone preferably in the range of from about 5 to about 36 feet per second (about 1.5 to about 11 m/s).

The second particulate stream can be fed to the second mixing zone at an angle which is counter-current to the flow of the fluidized first particulate stream in the reactor. The angle, as measured from the downstream length of the reactor, can be in the range of from about 30 to about 80 degrees.

Description of Specific Embodiments

The following is a description of certain embodiments of the invention, given by way of example only and with reference to the drawings. Referring to FIG. 1 a), a typical biomass conversion transport reactor system is shown wherein biomass is added to a hot heat carrier material stream already fluidized by lift gas. In this operation, pre-mature heating of the biomass in the feed line was observed which, in some cases, led to plugging and over cracking of the biomass. FIGS. 1 b) and c) show the inventive system wherein the hot heat carrier material is added to a biomass stream already fluidized by the lift gas. In this configuration, the pre-mature heating of the biomass is avoided. Also shown in FIGS. 1 b) and c) is the introduction of the hot heat carrier material at an angle resulting in counter-current flow of the heat carrier material to the flow path of the fluidized biomass. This tends to increase the mixing of the hot heat carrier material and biomass, which aids in heat transfer from the hot heat carrier material to the biomass. Also, when a catalyst is the heat carrier, the counter-current flow results in better contact between biomass, thermolysis products and catalyst.

What is claimed is:

1. A process comprising:
   (i) mixing a first particulate stream comprising a solid particulate biomass material with a lifting medium in a first mixing zone of a reactor, and fluidizing and transporting said first particulate stream in said lifting medium thereby forming a fluidized first particulate stream;
   (ii) passing said fluidized first particulate stream to a second mixing zone of said reactor; and
   (iii) injecting a second particulate stream comprising a heat carrier material into said second mixing zone for mixing with said fluidized first particulate stream, resulting in fluidized cracking of at least a portion of said solid particulate biomass material, wherein said second particulate stream is fed to said second mixing zone at an angle which is counter-current to the flow of said fluidized first particulate stream.

2. The process of claim 1 wherein said reactor is a riser reactor.

3. The process of claim 2 wherein said solid particulate biomass material comprises cellulose.

4. The process of claim 3 wherein said solid particulate biomass material comprises lignocellulose.

5. The process of claim 1 wherein said heat carrier material comprises a material selected from the group consisting of an inert particulate material, a particulate catalyst material, and combinations thereof.

6. The process of claim 1 wherein said solid particulate biomass material has received a pretreatment to make it more reactive.

7. The process of claim 1 wherein said first mixing zone has a temperature in the range of from about 0° C. to about 300° C.

8. The process of claim 7 wherein said first mixing zone has a temperature in the range of from about 125° C. to about 200° C.

9. The process of claim 1 wherein said first particulate stream further comprises a particulate inorganic material.

10. The process of claim 9 wherein said particulate inorganic material portion of said first particulate stream has the same composition as said second particulate stream.

11. The process of claim 1 wherein immediately prior to entering said second mixing zone said second particulate stream has a temperature in the range of from about 450° C. to about 1000° C.

12. The process of claim 11 wherein immediately prior to entering said second mixing zone said second particulate stream has a temperature in the range of from about 500° C. to about 800° C.

13. The process of claim 1 wherein said first particulate stream is fed into said first mixing zone by gravity means, by a positive displacement means, or by fluid conveyance.

14. The process of claim 13 wherein said first particulate stream is fed into said first mixing zone by a positive displacement means selected from the group consisting of a screw feeder, a posimetric feeder, a screw feeder in combination with a vibratory feeder, and a combination of block valves and a vibratory feeder.

15. The process of claim 13 wherein said first particulate stream is fed into said first mixing zone by gravity means through a fluidized bed feeder and control valve.

16. The process of claim 1 wherein said lifting medium in said first mixing zone has a velocity of from about 5 to about 36 feet per second (about 1.5 to about 11 m/s).

17. The process of claim 1 wherein said angle, as measured from the downstream length of said reactor, is in the range of from about 30 to about 80 degrees.

* * * * *